United States Patent [19]

Manly

[11] 3,714,636

[45] Jan. 30, 1973

[54] AUTOMATIC EDITING METHOD WITH PAGE FORMATTING

[76] Inventor: Ron Manly, 1922 West El Segrindo Boulevard, Gardena, Calif. 90249

[22] Filed: May 1, 1972

[21] Appl. No.: 249,216

Related U.S. Application Data

[60] Division of Ser. No. 63,020, Aug. 11, 1970, Pat. No. 3,676,856, which is a continuation of Ser. No. 275,415, April 24, 1963.

[52] U.S. Cl. .................................... 340/172.5, 197/20

[51] Int. Cl. ........... G06f 7/30, G06f 3/08, G06r 5/00

[58] Field of Search ......... 444/1; 340/172.5, 146.3 B, 340/174.1; 197/20

[56] References Cited

UNITED STATES PATENTS

| | | | |
|---|---|---|---|
| 3,676,856 | 7/1972 | Manly | 340/172.5 |
| 3,426,324 | 2/1969 | Manly | 340/146.3 B |
| 3,403,225 | 9/1968 | Mislan et al. | 340/172.5 X |
| 3,328,764 | 6/1967 | Sorensen et al. | 340/172.5 |
| 3,289,176 | 11/1966 | Garth et al. | 340/172.5 |
| 3,248,705 | 4/1966 | Dammann et al. | 340/172.5 |
| 3,245,046 | 4/1966 | Bernard et al. | 340/172.5 |
| 3,241,120 | 3/1966 | Amdahl | 340/172.5 |
| 3,233,224 | 2/1966 | Foster et al. | 340/172.5 |
| 3,107,342 | 10/1963 | Estrems et al. | 340/172.5 |
| 3,007,137 | 10/1961 | Page et al. | 340/172.5 |
| 2,967,295 | 1/1961 | Dirks | 340/172.5 |
| 3,332,617 | 7/1967 | Higonnet et al. | 234/5 |
| 2,968,383 | 1/1961 | Higonnet et al. | 197/20 |
| 2,934,145 | 4/1960 | Blodgett | 197/20 |
| 2,961,644 | 11/1960 | Gardiner | 340/174 |
| 2,926,337 | 2/1960 | Rivas | 340/174 |
| 2,854,652 | 9/1958 | Smith | 340/173 |
| 2,853,696 | 9/1958 | Mendelson | 340/173 |
| 2,700,447 | 1/1955 | Blodgett | 197/20 |
| 2,379,862 | 7/1945 | Bush | 197/84 |
| 2,067,183 | 1/1937 | Green | 197/1 |

*Primary Examiner*—Paul J. Henon
*Assistant Examiner*—Jan E. Rhoads

[57] ABSTRACT

Methods and systems to avoid manually retyping or rekeyboarding textual material when revising or correcting the information contained in a record either while originally preparing the information or at a later date. The use of print readers or character recognition devices to accomplish this "editing" is disclosed, as well as editing using paper tape typewriters, display devices, and other means such as using editing instructions. Methods are also disclosed for automatically reformatting the information into lines after insertions, deletions, or other changes requiring shifting of the line layout of the information.

6 Claims, 1 Drawing Figure

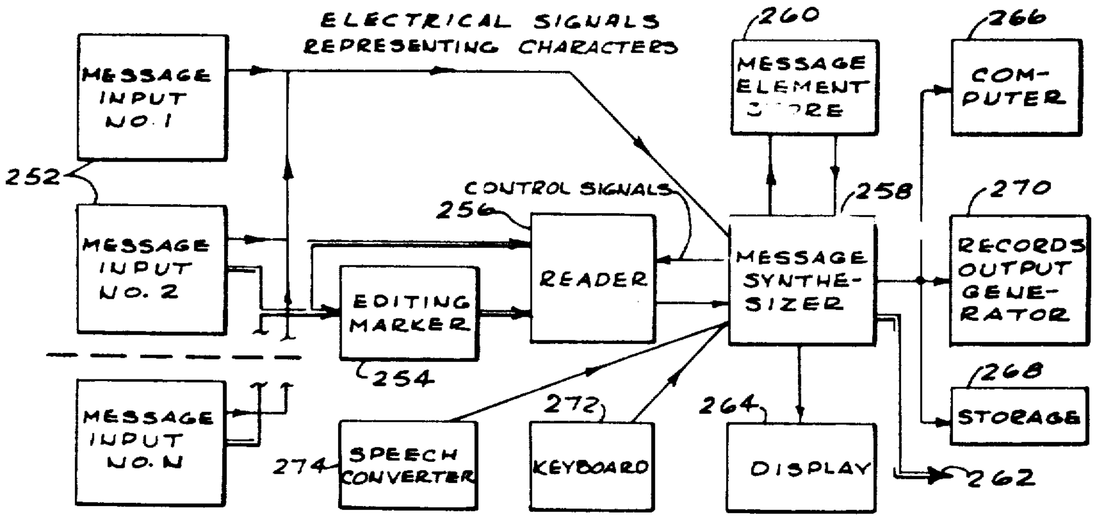
ELECTRICAL SIGNALS REPRESENTING CHARACTERS
MESSAGE INPUT NO. 1
MESSAGE INPUT NO. 2
MESSAGE INPUT NO. N
252
CONTROL SIGNALS
256
READER
EDITING MARKER
254
MESSAGE ELEMENT
260
MESSAGE SYNTHESIZER
258
COMPUTER
266
RECORDS OUTPUT GENERATOR
270
STORAGE
268
SPEECH CONVERTER
274
KEYBOARD
272
DISPLAY
264
262

AUTOMATIC EDITING METHOD WITH PAGE FORMATTING

CROSS-REFERENCES TO RELATED APPLICATIONS

This is a division of application Ser. No. 63,020 filed Aug. 11, 1970, now U.S. Pat. No. 3,676,856, which in turn is a continuation of application Ser. No. 275,415 filed Apr. 24, 1963.

BRIEF SUMMARY OF THE INVENTION

Briefly, in one example of the present invention there is provided a manually operated typewriter having a type font which for each character makes two impressions. One of the impressions is a more or less conventional typewritten character which is man readable; and the other is a digitally encoded set of information bits which is machine readable. Alternatively, the type font may be conventionally unitary, but readable by an appropriate character reader. In either event the impression is machine readable.

The document output of this typewriter may be designated as the original record and may be a first draft of, for example, a technical paper. The author then proofreads the original record and, with a special pen, manually makes editing marks directly onto the paper. The editing marks in this example may be of three different optically machine separable colors, and may be inserted in one of three different portions of the space allotted to a particular character, for example, above, below, or in front of the typed character. In a specific example, a vertical stroke of the editing pen in a particular color along the left hand edge of a character space may be a "start delete" edit instruction to delete what follows. A horizontal edit stroke of a different color along the top edge of the character space of a succeeding character may be an edit instruction to "stop delete." Hence, the completed instruction is to delete whatever material or blank character spaces were originally disposed between the two edit marks.

The distinction between "deleting" and "removing" should be carefully noted. The latter, applied to a typewritten page, is the removal of any printing which may occur; more generally, it is the conversion of any other character into a blank character space.

In another example, a particular edit mark or more generally stated, edit signal, may be an instruction to "insert here" material which is separately generated by the original typewriter mentioned above. In addition, "delete" and "insert," as well as other instructions, may be combined as, for example, to form a "replace" instruction.

The integrated automatic editing system of this example includes two machine readers; one for reading the original record with the manually scribed editing marks or signals thereon, and the second for reading the "insert record" which includes additional material to be inserted in the final record in accordance with the editing signals. Each of the readers is coupled to an automatic final record generator, such as an electric typewriter which is operated by electrical signals from readers and particularly, but not exclusively, from the output terminals of their respective selection matrices.

Included within the reader for the original record is an edit mark reader which observes each character space and determines whether an edit mark has been placed therein and if so, which of the three colors it is and in which portion of the space it has been scribed. The edit mark reader then interprets the edit mark and instructs the machine readers alternately to provide the desired combination of signals in proper sequence to the generator of the final record.

It should be noted that it is not necessary to record the edit marks on the man readable record but rather they can be recorded on a transparent page placed over the man readable record, or on a page using a pantograph to locate the edit marks spatially correct with respect to the man readable record. In another embodiment of the invention, editing signals are not explicitly located spatially but rather their coordinates are recorded in digital form. It is apparent to anyone skilled in the art that this can be mechanized in a variety of ways including digital and analog recordings of the desired editing location, various types of pointers or positioning indicators, direct electrical signalling to a message synthesizer instead of a recording on hardcopy, or the like. For example, the record to be edited may be placed in a holder so that it has a fixed relationship to a pointer which is positioned by the operator to indicate the location of desired editing changes. Pickoff potentiometers may be provided on the linkages of the pointer to produce signals proportionate to the X and Y coordinates of the location of the desired editing change. This location is recorded, on what may be designated an "edit location and edit instruction record," with other edit symbols indicating the type of change required — whether an "insertion," the "start of a deletion," etc.

Also the above method of indicating editing location may be used with configurations that enter records on which the primary intelligence is only machine readable, as well as those that enter records into the reader that are man and machine readable. In some embodiments only the locations where an editing operation is to occur are signalled by the editing marks provided by the methods described above and earlier; the further editing instructions being provided by a separate edit instruction record. In some applications the edit instructions are presented on the same record as inserts are, such a record being designated as an "insert and instruction record."

The primary intelligence (i.e., other than the edit signals and edit instructions) on the symbolic records entering the reader may be in a man and machine readable form, a man readable form specially constructed to be machine readable, a more or less conventional man readable form (on which a character recognition device of any appropriate type is used, or only a machine readable form (for example, a conventional punched tape, punched card, magnetic tape, or the like). The machine readable form may be entered alone, or it may be part of a "dual form" consisting of a machine readable record and a separate man readable record but with the man readable record containing machine readable edit signals thereon. A more generalized example of the dual form utilizes a machine readable record supplemented by edit location, or edit location and edit instruction records.

In such a more generalized example of this dual form, the separate record containing the edit signals need not be the man readable record, since the edit mark reader which reads this type of record makes no use of the man readable symbols on the record. Thus, an edit location record, such as a transparent page or a page that had the edit marks recorded in an appropriate place, as by a pantograph, as discussed earlier, may provide the edit location signals in this example. This edit location record may be supplemented by a record containing further editing instructions indicating what kind of editing is to be effected at the locations designated. Alternatively, the further editing instructions may be included on the edit location record, in which case the record may be designated an "edit location and edit instruction record."

BRIEF DESCRIPTION OF THE FIGURE

Further details of these and other novel features and their principles of operation, as well as the objects and advantages will become apparent and be best understood from a consideration of the description contained in the application identified below (which is incorporated herein by reference) when taken in connection with the drawings therein.

FIG. 12 from said incorporated application is presented herein. This figure is a generalized block diagram of the system of the invention.

Referring to the particular Figures of the referenced application and the FIGURE presented herein, it is stressed that the details shown are by way of example only and are presented in the cause of providing what is believed to be the most useful and readily understood description of the principles of the invention. The detailed showing is not to be taken as a limitation upon the scope of the invention which is to be measured by the appended claims forming a part of this specification.

IDENTIFICATION OF REFERENCED APPLICATION

The contents of application Ser. No. 63,020, filed Aug. 11, 1970, now U.S. Pat. No. 3,676,856, in its entirety is herein incorporated by reference.

What is claimed is:

1. Method of editing a message at a message element location arbitrarily selectable subsequent to the original generation of said message comprising the steps of:
   - providing a first message element train;
   - proofreading a man readable page format of said message to be edited to determine desired editing changes;
   - providing an edit location and edit instruction second message element train specifying the numerical coordinates of said arbitrarily selectable message element location where editing is desired subsequent to the original generation of said message and the desired editing changes in said first message element train;

- automatically generating a third message element train containing the intelligence of said first message element train as modified in accordance with the desired editing changes specified by said second message element train; and
   - associating appropriate formatting signals with said third message element train to permit page formatting.

2. Method of editing a message according to claim 1 in which said step of providing a second message element train comprises
   - manual keyboarding indicating the message elements of said second message element train,
   - automatically generating a man readable hardcopy record of said message element train in response to said keyboarding, and
   - automatically providing said second message element train in the form of electrical signals in response to said keyboarding; and
   - in which said second message element train specifies the numerical coordinates of the message element location of the desired editing change in said first message element train.

3. Method of editing a message according to claim 2 in which said second message element train provides edit location coordinates identifying said first message element train;
   - which includes the step of automatically storing the first message element train in a message element store; and
   - in which said step of automatically generating a third message element train includes automatically retrieving said first message element train from said message element store upon the basis of said edit location coordinates provided by said second message element train.

4. The method of editing of machine translations of natural language messages in accordance with claim 2 in which said step of providing a first message element train includes the steps of
   - providing a natural language message, and automatically translating said message and generating a first message element train containing said translated message.

5. The method of editing of machine recognized speech messages in accordance with claim 2 in which said step of providing a first message element train includes the steps of
   - providing a natural language speech message, and
   - automatically translating said message and generating a first message element train containing said translated message.

6. Method of editing a message according to claim 1 in which said step of providing said first message element train comprises providing a man-machine readable record containing said first message element train recorded thereon.

* * * * *